United States Patent [19]

Fumey

[11] Patent Number: 5,616,891
[45] Date of Patent: Apr. 1, 1997

[54] SEALING PANEL, IN PARTICULAR FOR AUTOMOBILES, INCLUDING A LOUDSPEAKER HOUSING

[75] Inventor: Franck Fumey, Dijon, France

[73] Assignee: Plasto SA, Chenove, France

[21] Appl. No.: 481,363

[22] PCT Filed: Dec. 7, 1994

[86] PCT No.: PCT/FR94/01428

§ 371 Date: Jul. 7, 1995

§ 102(e) Date: Jul. 7, 1995

[87] PCT Pub. No.: WO95/15870

PCT Pub. Date: Jun. 15, 1995

[30] Foreign Application Priority Data

Dec. 8, 1993 [FR] France .................... 93 14731

[51] Int. Cl.⁶ .................................................. H05K 5/00
[52] U.S. Cl. .................................... 181/141; 181/150
[58] Field of Search .............................. 181/141, 150, 181/199; 381/86

[56] References Cited

U.S. PATENT DOCUMENTS

| | | | |
|---|---|---|---|
| 4,277,653 | 7/1981 | Pawelzick | 181/150 X |
| 4,337,380 | 6/1982 | Tezuka | 181/150 X |
| 4,790,407 | 12/1988 | Yamamoto et al. | 181/141 |
| 4,853,966 | 8/1989 | Skrzycki | 181/150 X |
| 4,905,860 | 3/1990 | Kurihara et al. | 381/86 X |
| 4,928,788 | 5/1990 | Erickson | 181/141 |
| 5,117,938 | 6/1992 | Whanhaeng | 181/150 X |
| 5,414,229 | 5/1995 | Rocheleau et al. | 181/150 |

FOREIGN PATENT DOCUMENTS

| | | |
|---|---|---|
| 2724631 | 12/1978 | Germany . |
| 3220779 | 12/1983 | Germany . |
| 3510018 | 1/1986 | Germany . |
| 3817848 | 9/1989 | Germany . |
| 287296 | 11/1988 | Japan . |
| 5238263 | 9/1993 | Japan . |

*Primary Examiner*—Khanh Dang
*Attorney, Agent, or Firm*—Hoffmann & Baron

[57] ABSTRACT

A sealing panel for automobile doors maintains weather-tight characteristics without degrading the acoustic response of a loudspeaker mounted in the panel. The panel includes a cup-shaped loudspeaker housing having a back which is provided with cells. The cells prevent reflection of sound radiated from the rear of the loudspeaker. The cells are open at one end, where they interface with the back of the loudspeaker housing, and the opposite ends of the cells have at least one opening therein. The panel is made from a sheet material such as a thermosetting plastic. The cells may be frustoconical with an average diameter between 3–20 mm and a depth of about 3–25 mm.

10 Claims, 2 Drawing Sheets

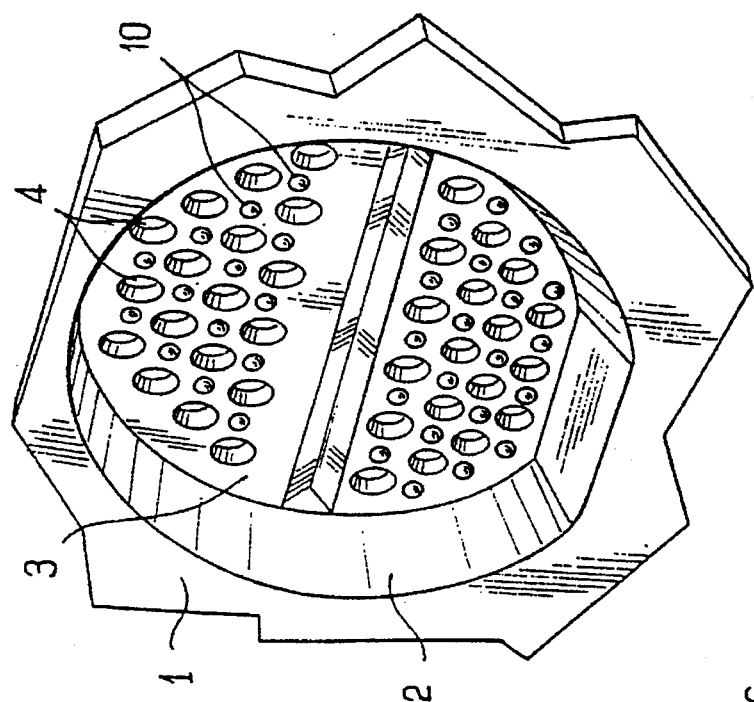
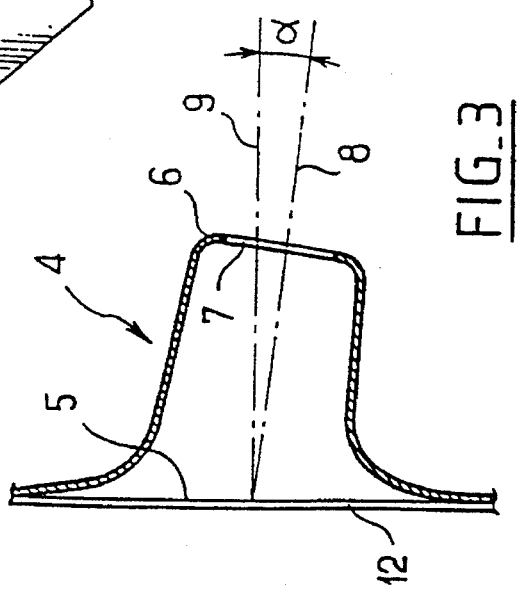
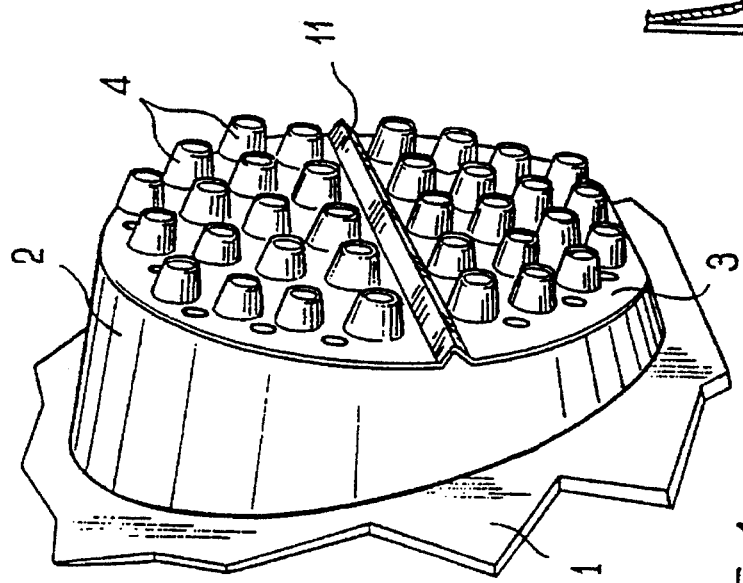

SEALING PANEL, IN PARTICULAR FOR AUTOMOBILES, INCLUDING A LOUDSPEAKER HOUSING

The present invention concerns a sealing panel for automobiles, in particular for sealing doors, and in which a special loudspeaker housing is formed such that he original acoustical properties of the loudspeaker are preserved.

PRIOR ART

In the construction of automobile vehicles it is necessary to seal the interiors of the doors to prevent rainwater entering the passenger compartment and coming into contact with the interior finish of the vehicle. One known way to provide this seal is to glue an impermeable film to the internal structures of the door, the function of this film being to prevent infiltration of water and entry of air and dust into the vehicle. These impermeable films are usually in the form of a plastic material film coated with an adhesive to facilitate application. Foam films can also be used, in particular polyethylene foam; polyethylene foam films are usually between 2 mm and 10 mm thick and a bead of glue is applied to their perimeter; they can be thermoformed so as to mate intimately with the pressed sheet metal supporting structure of the door. More complex structures can also be used made up of a plurality of layers of different materials, these improvements usually being intended to improve the soundproofing of the passenger compartment and to improve the comfort of the passengers.

However, the presence of the sealing panel disturbs the operation of the loudspeakers which are usually located in the door structure.

The sealing panel is in the immediate vicinity of the rear of the loudspeaker and reflects sound radiated from the rear of the loudspeaker towards the passenger compartment. The reflection of the sound from the rear of the loudspeaker significantly disturbs the acoustical quality perceived within the passenger compartment. To avoid this problem it is standard practice to cut out the sealing panel where the loudspeaker is to be located: this improves the acoustic result, but the panel is no longer able to fulfil its sealing role and rainwater or dust may infiltrate into the interior lining of the door.

OBJECT OF THE INVENTION

An object of the present invention is to propose a new type of sealing panel, especially for automobile doors, which has the advantage of preserving the acoustic response properties of the loudspeakers.

SUMMARY OF THE INVENTION

In accordance with the invention a sealing panel for automobile doors is made from a sheet material that is shaped to provide a loudspeaker housing having a special structure and the back of which is provided with cells open at one end and having at least one opening at the opposite end.

An improved acoustic property sealing panel of the invention is made from a sheet material which can be deformed into shape. The material is usually a thermosetting plastics material such as polyethylene or polypropylene and may contain reinforcing agents such as glassfibres and fireproofing agents. These sheets can be in the form of a film but it is preferable to use a plastics material in the form of a closed cell foam, the sheet having a thickness between 1 mm and 10 mm. Thermosetting composite sheets made up of a plurality of layers of different materials can also be used, especially to improve the thermal insulation and the soundproofing of the passenger compartment.

The material is shaped to mate perfectly with the structures of the door inside which it is to be fitted. The shaping is usually effected by thermoforming or hydroforming, methods well known to the person skilled in the art.

In accordance with the invention, in addition to the specific shapes due to the structure of the door, special patterns are formed at the back of the housing for the loudspeaker, the function of which is to prevent reflection of the sound radiated from the rear of the loudspeaker. To achieve this result the patterns are disposed on the outside face of the back of the housing opposite the inside face on which the loudspeaker bears and are frustoconical in shape, with a circular, square or trapezoidal cross-section. The loudspeaker housing of a sealing panel of the invention is therefore cup-shaped with the bottom having a multitude of cones facing the structure of the door.

To obtain a good acoustic result conical cells are formed over all of the back of the cup, with an approximate mean diameter between 3 mm and 20 mm and an approximate depth between 3 mm and 25 mm.

The cones are preferably perforated and the axes of the cones are preferably inclined downwards at an angle $\alpha$ between 4° and 20° to the horizontal. This inclination prevents entry of water via the perforations.

Alternatively, it is possible to add to the back of the loudspeaker housing a very thin (approximately 5 microns to 30 microns thick) film of polyethylene, polyester, polyurethane or polypropylene, either glued or welded in place: a film of this kind provides a good seal and maintains the acoustic improvement due to the perforated patterns.

The following example and the drawings provide a better understanding of the invention, but this embodiment and its variants, the method of fabricating it and its applications are not limiting on the invention.

BRIEF DESCRIPTION OF THE DRAWINGS

FIG. 1 is a perspective view of the outside face of the loudspeaker housing of an automobile vehicle sealing panel.

FIG. 2 is a perspective view of the inside face of the same loudspeaker housing.

FIG. 3 is a view in vertical section of one of the cones shown in FIG. 1.

DETAILED DESCRIPTION OF PREFERRED EMBODIMENT

Figure 4A:
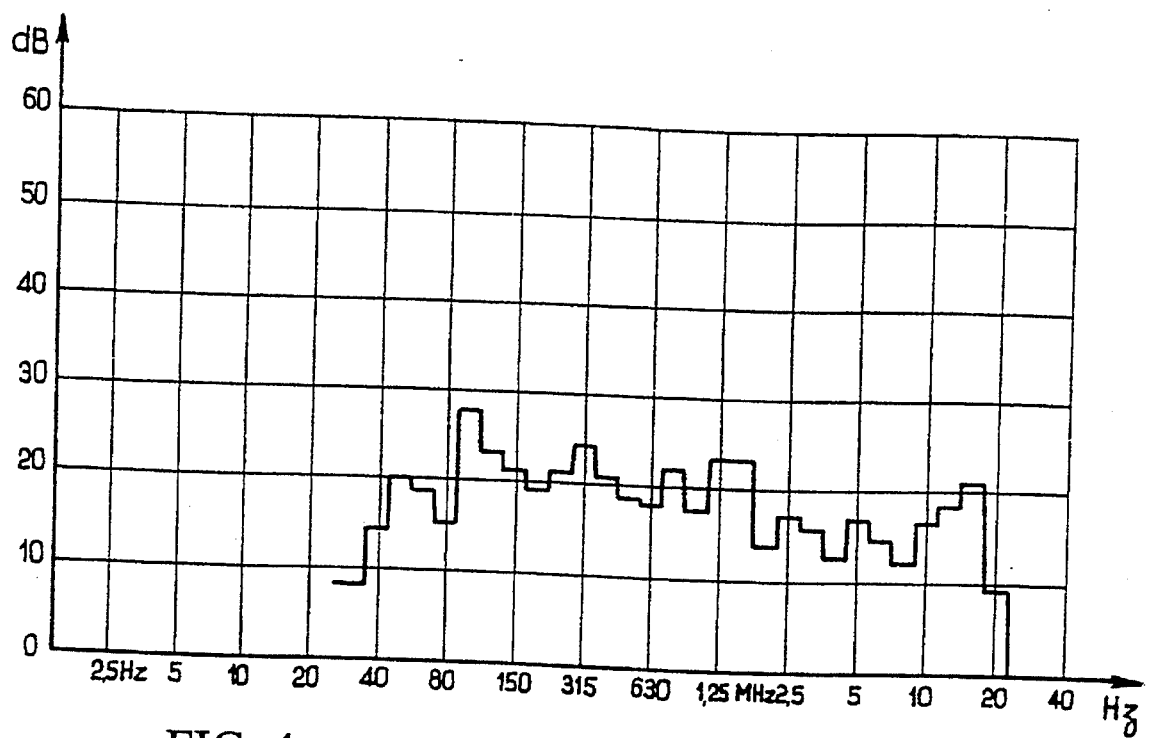
FIG. 4a shows the frequency response of a loudspeaker with a sealing panel of the invention absent.

A sealing panel 1 for an automobile door and incorporating a loudspeaker housing 2 is thermoformed from a 2 mm thick sheet of closed cell polyethylene foam (density 67 kg/m$^3$) containing a fireproofing agent. The loudspeaker housing is cup-shaped and substantially circular with an inside diameter of approximately 136 mm and a height between 30 mm and 50 mm (the shape of the housing corresponds substantially to FIG. 1). Fifty cells 4 are distributed over the outside face of the back 3 of the loudspeaker housing 2. Each cell 4 can have any cross-section, not necessarily that of a body of revolution, and has an open end 5 and an opposite end 6 with at least one opening 7, as shown in FIG. 3. Each cell 4 is preferably frustoconical with the bottom open and the top having the opening 7 for the sound waves to pass through. The axis 8 of each cell 4 is inclined at an angle α of approximately 7° downwards to the perpendicular 9 to the back 3 of the housing or cup 2. Of course, it is possible to provide a plurality of smaller openings at the end 6 of each cell 4. After fitting to the vehicle, the axis of the cells is inclined downwards at an angle of 15° to the horizontal.

The cells 4 are preferably in a quincunx arrangement, but any uniform or otherwise arrangement can be used. In the embodiment shown the cells are all the same size but it is also possible to use cells of different sizes, for example small diameter cells in the upper part and large diameter cells in the lower part.

Protuberances 10 are provided between the cells 4, projecting towards the inside of the loudspeaker housing 2, to bear against the loudspeaker to prevent the loudspeaker blocking the cells. A reinforcing rib 11 can also be provided on the bottom 3 of the housing 2 and the cells 4 can be distributed symmetrically relative to said rib 11.

The thermoforming operation is carried out by zoned infra red heating (heating time approximately 10 seconds) and then vacuum forming on an aluminium mould. After shaping, the ends of all the cones are cut off by a die-stamping system to form openings with a diameter of 4 mm.

A bead of hot-melt glue protected by a strip of non-adhesive backing paper is applied around all of the perimeter of the panel obtained in this way.

Figure 4B:
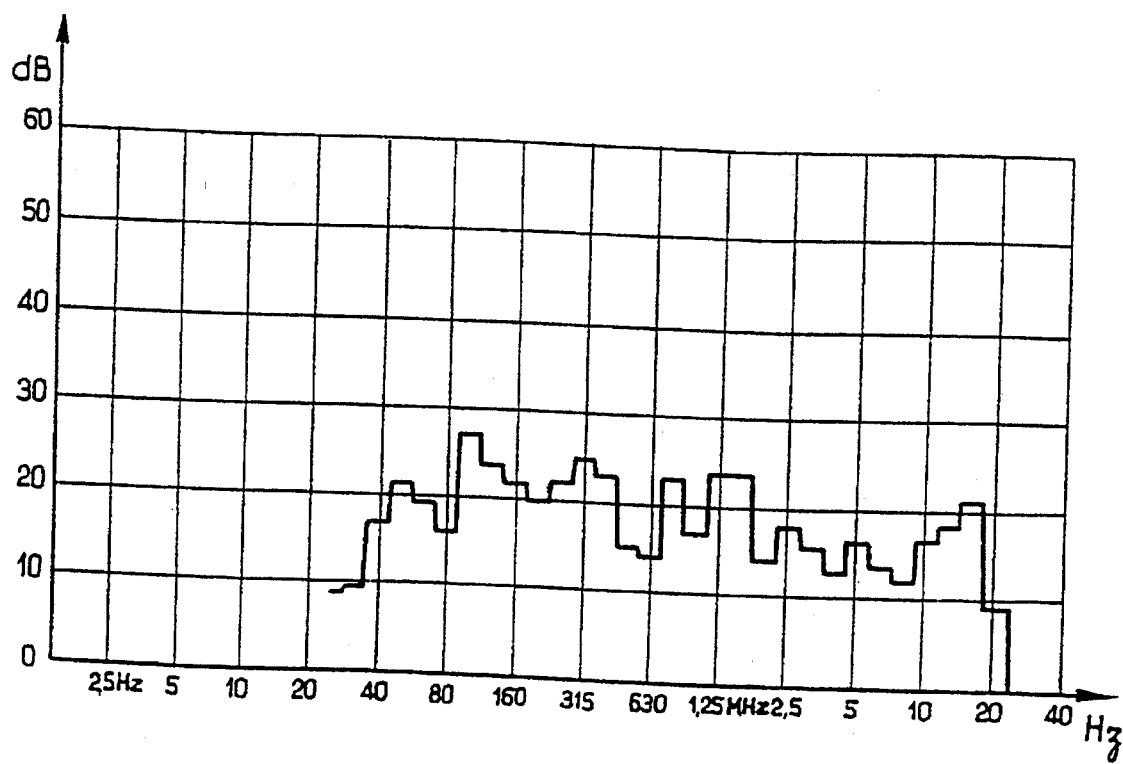
FIG. 4b shows the frequency response of a loudspeaker with a sealing panel of the invention present.

FIGS. 4a and 4b show shows the frequency response curves of a loudspeaker with the sealing panel of the above example present (FIG. 4b) and absent (FIG. 4a). These curves show that the response of the loudspeaker is virtually unaffected by the presence of the sealing panel, i.e. that the acoustic quality of the system is preserved.

Alternatively, a 135 mm diameter disk 12 cut from a 12 μm thick self-adhesive polyester film is added to the panel 1 and glued to the lower part of the back 3 of the loudspeaker housing 2. This provides a panel which is entirely dustproof and which disturbs the acoustics of the loudspeaker very little, if at all.

The sealing panels of the above embodiment find an application in sealing doors of automobiles fitted with loudspeakers in order to preserve the acoustical properties of the audio equipment.

What is claimed is:

1. A preformed sealing panel for automobiles comprising:
    a panel portion;
    a loudspeaker housing formed in said panel portion, said loudspeaker housing having a back; and
    a plurality of cells formed in said back of said loudspeaker housing, said cells having first ends and opposite ends, said cells having a height of between 3 mm and 25 mm, said first ends being open and interfacing with said back of said loudspeaker housing, said opposite ends having at least one opening therein.

2. The sealing panel of claim 1, wherein said cells have axes and said axes of said cells are inclined from a perpendicular to said back of said loudspeaker housing.

3. The sealing panel of claim 1, wherein said cells have axes and said axes of said cells are inclined downwardly at an angle between 40° and 20° to the horizontal when said panel portion is fitted to a vehicle.

4. The sealing panel of claim 1, wherein said cells are formed in said back of said loudspeaker housing in a quincunx arrangement.

5. The sealing panel of claim 1, wherein said cells are frustoconical.

6. The sealing panel of claim 5, wherein said cells have an average diameter and the average diameter of said cells is between 3 mm and 20 mm.

7. The sealing panel of claim 1, wherein said back of said loudspeaker housing has an inside face, further comprising a plurality of protuberances formed on said inside face of said back of said housing between said cells.

8. The sealing panel of claim 1, further comprising a reinforcing rib formed in said back of said loudspeaker housing.

9. The sealing panel of claim 1, wherein said back of said loudspeaker housing has an inside face, further comprising a film between 5 μm and 30 μm thick, said film being fastened to said inside face of said back of said loudspeaker housing by at least one of gluing and welding.

10. In combination:
    an automotive vehicle; and
    a preformed sealing panel for automobiles, said preformed sealing panel being applied to said automotive vehicle to improve acoustics of at least one loudspeaker in said automotive vehicle, said preformed sealing panel comprising:
    a panel portion;
    a loudspeaker housing formed in said panel portion for receiving said at least one loudspeaker, said loudspeaker housing having a back; and
    a plurality of cells formed in said back of said loudspeaker housing, said cells having first ends and opposite ends, said cells having a height of between 3 mm and 25 mm, said first ends being open and interfacing with said back of said loudspeaker housing, said opposite ends having at least one opening.

\* \* \* \* \*